F. W. LOVEJOY.
PHOTOGRAPHIC FILM.
APPLICATION FILED AUG. 13, 1917.
1,276,779.
Patented Aug. 27, 1918.
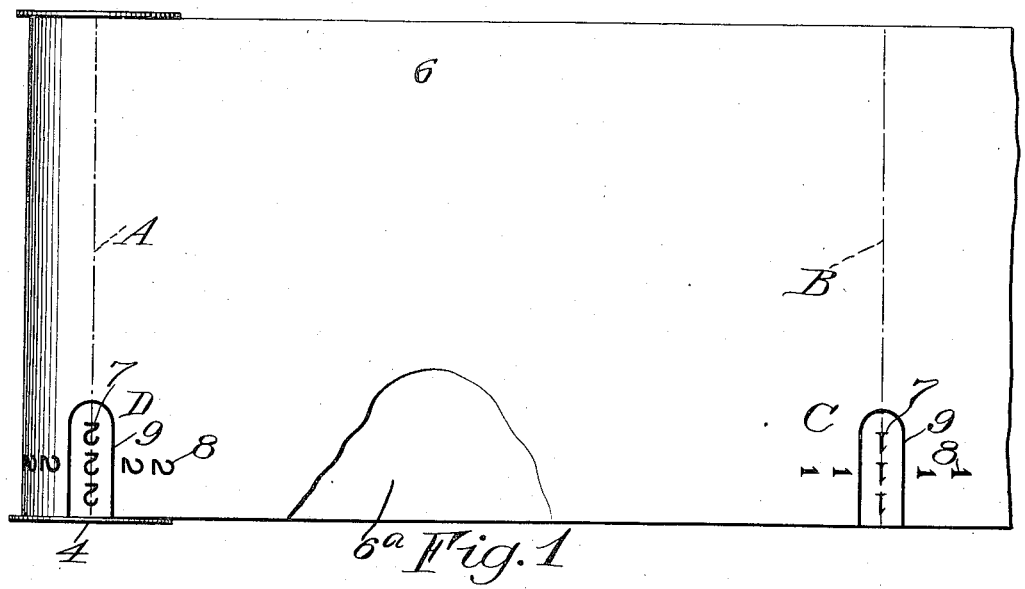
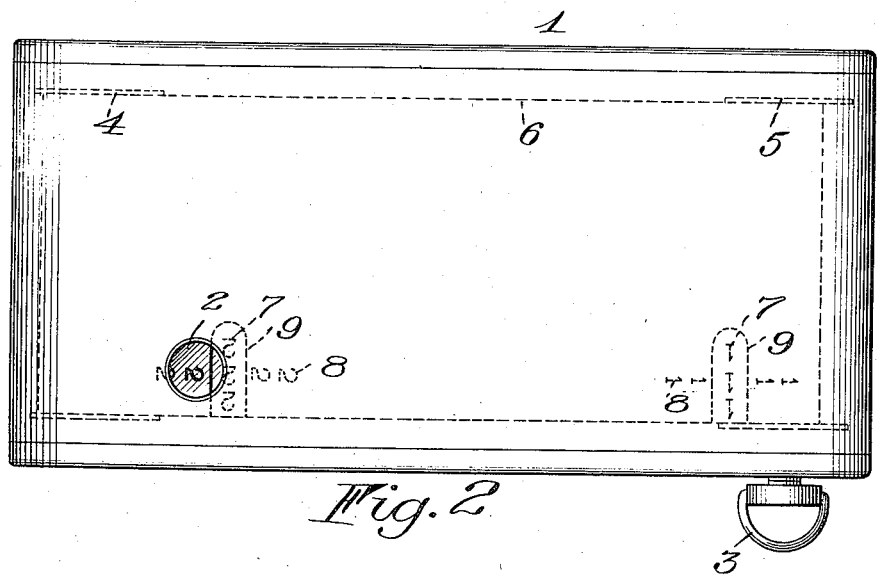
WITNESSES:
INVENTOR
Frank W. Lovejoy
BY
his ATTORNEY

UNITED STATES PATENT OFFICE.

FRANK W. LOVEJOY, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC FILM.

1,276,779.     Specification of Letters Patent.    Patented Aug. 27, 1918.

Application filed August 13, 1917. Serial No. 185,830.

*To all whom it may concern:*

Be it known that I, FRANK W. LOVEJOY, of Rochester, in the county of Monroe and State of New York, have invented certain new and useful Improvements in Photographic Films; and I do hereby declare the following to be a full, clear, and exact description of the same, reference being had to the accompanying drawings, forming a part of this specification, and to the reference-numerals marked thereon.

My present invention relates to photography and more particularly to film strips of film cartridges that are wound from spool to spool of a film camera to successively display the picture areas of the sensitive medium in the field of exposure. Such strips usually comprise a transparent base having the sensitive medium coated thereon and associated with a backing strip that forms a protective covering at the rear. At proper intervals, the backing strip, running with the sensitized strip, is provided with suitable marks that pass a non-actinic window in the back of the camera and the alinement of each mark with the window indicates that a particular area of the sensitized film has been measured off and is in place for exposure. The object of my invention is to so form and arrange these characters on the back of the film strip whether it be single or compound, that, with a relatively small window in the camera, the operator will be able to observe and determine the position of his film even though he has run by the window with the indicating mark that should have been halted in register therewith. To these and other ends the invention resides in certain improvements and combinations of parts all as will be hereinafter more fully described, the novel features being pointed out in the claim at the end of the specification.

In the drawings:

Figure 1 is a plan view of a film strip constructed in accordance with and illustrating one embodiment of my invention, the said strip being partially unrolled from a spool or cartridge and the end portion together with a part of the intermediate portion being broken away, and Fig. 2 is a rear view of a camera showing my film strip in operation therein.

Similar reference numerals throughout the several views indicate the same parts.

Referring first to Fig. 2, 1 indicates a camera; 2 the ruby window or non-actinic opening in the back thereof, and 3 the film winding key. In dotted lines are shown the feed spool 4, the winding spool 5, and the film strip 6 that travels from one to the other. As before indicated, this film strip 6 may consist of a one-piece sensitized body or the usual compound strip comprising the sensitized base and a superposed but separate duplex paper or other backing. In Fig. 1, the dotted lines A—B represent the limits of the second exposure area of the sensitive body 6ª beneath or on the front side of the strip. At the advance end of this area is a marking C which corresponds to the preceding picture area of which the line B is the rearward limit. The area A—B has a marking D. The markings C and D each consists, in the present instance, of two intersecting rows of numerals or characters 7 and 8 arranged at right angles to each other. The row 7 must be brought in register with the opening 2 of the camera to dispose the corresponding picture area in position for exposure. This row extends transversely of the strip and if the film has not been cut accurately or is not feeding straight between the spools, one or another of the characters in the row is bound to be visible through the opening 2. The characters in this row are inclosed or provided with a border line as at 9, which reveals their proximity to the opening 2 and identifies them as the controlling characters.

The row of characters 8 extends in the direction of winding movement or longitudinally of the strip and parallel with its edges. The character at the forward end of the row, during winding, gives advance warning of the near approach of the characters 7 while the character at the rear end, in case of overwinding, gives notice and forms a means of determining which designation has been overrun and which exposure area has been misplaced so that only a portion of its lies within the field of exposure of the camera.

An instance of the working of the device is shown in Fig. 2. Here the second exposure area A—B has been overrun and the controlling characters 7 are no longer visible through the sight opening 2 so that while the line 9 indicates the overrunning it does not indicate which number has been overrun. The characters 8, however, are in view and give this information.

I claim as my invention:

A film cartridge embodying a sensitive medium associated with a strip of material adapted to be wound past the sight opening of a film camera and being provided on its rear or outer surface with two intersecting lines of repeated numbers for each exposure area of the film, said lines of numbers extending at right angles to each other with one of them parallel with the longitudinal edges of the strip.

FRANK W. LOVEJOY.

Witnesses:
 DONALD H. STEWART,
 HELEN M. FRASER.